Patented Mar. 7, 1944

2,343,483

UNITED STATES PATENT OFFICE 2,343,483

INTERPOLYMERS OF STYRENE AND THE REACTION PRODUCT OF MALEIC ESTERS WITH RELATIVELY NONCONJUGATED DRYING OILS AND PROCESS OF PREPARING THE SAME

Ben Edmund Sorenson, Upper Darby, Pa., assignor to E. I. du Pont de Nemours & Company, Wilmington, Del., a corporation of Delaware No Drawing. Application May 17, 1940, Serial No. 335,788

14 Claims. (Cl. 260—23)

This invention relates to interpolymers of a resinous type and more particularly to resinous interpolymers of styrene and the reaction product of maleic acid esters of unsaturated alcohols and fatty drying oils having a relatively low degree of conjugation.

This invention has as a principal object the provision of means for preparing homogeneous resinous products. Another object is to prepare homogeneous resinous products as vehicles for decorative and protective coating compositions. A further object is the preparation of a new type of decorative and protective coating composition for use as enamels, etc. Other objects will appear hereinafter.

These objects are accomplished according to the present invention by reacting at elevated temperatures under suitable polymerizing conditions styrene and the resinous reaction product or modified oils obtained from fatty oils having a relatively low degree of conjugation and maleic acid esters of unsaturated alcohols as diallyl or dimethallyl maleates.

The invention will be more fully understood from the following examples which are given by way of illustration but not limitation except in so far as defined in the appended claims. The parts are by weight.

Example I

| | Parts |
|---|---|
| Linseed oil-dimethallyl maleate intermediate (interpolymer) | 200 |
| Styrene | 175 |
| Low flash solvent naphtha | 125 |
| Benzoyl peroxide | 2 |
| Low flash solvent naphtha | 125 |

The linseed oil-dimethallyl maleate intermediate and the styrene are placed in a 3 necked round bottomed flask suitably equipped with a stirrer, reflux condenser and a thermometer which extends into the liquid in the flask. The liquid is constantly agitated and heated to refluxing temperature and the refluxing continued until the temperature reaches 225° C. To reach this temperature requires approximately 6-7 hours. To the viscous resin thus produced is added 125 parts of low flash solvent naphtha and the refluxing continued. During this refluxing the benzoyl peroxide dissolved in the second portion of the low flash naphtha is added dropwise through a dropping funnel through the top of the condenser. The benzoyl peroxide solution is added over a period of approximately 5 hours. The temperature of the refluxing liquid varies from approximately 153° C. at the start to approximately 147° C. after all of the benzoyl peroxide solution has been added.

The finished resin solution which contains only a small amount of unpolymerized styrene possesses the following constants:

| | |
|---|---|
| Viscosity | T |
| Color | 2.5 |
| Solids percent | 58.6 |

All viscosity and color standards used herein are on the Gardner-Holdt scale.

The resin solution may be further diluted to a flowing viscosity with either or both aromatic or aliphatic hydrocarbon solvents. A flowout of the resin so thinned and containing 0.1% (based on the oil) of cobalt drier air dries in from 2 to 3 hours to a satisfactory hard film. When a flowout is baked at 200° F. (93° C.) for 1 hour a hard, tough and durable film is formed.

The linseed oil-dimethallyl maleate intermediate used in this example is prepared by reacting the linseed oil and the dimethallyl maleate in the ratio of 75 parts of oil to 25 parts of the ester at elevated temperature (260° C.) under reflux conditions until a viscosity of I-J (Gardner-Holdt scale) is obtained. The time required for the reaction is approximately 2½ hours. This product as well as similar products used in subsequent examples is described in detail in my co-pending application Serial No. 335,787, filed May 17, 1940, now Patent No. 2,280,862.

Example II

| | Parts |
|---|---|
| Linseed oil-dimethallyl maleate intermediate (interpolymer) | 800 |
| Styrene | 915 |
| Benzoyl peroxide | 2.5 |
| Low flash solvent naphtha | 1125 |

The linseed oil-dimethallyl maleate intermediate product, styrene and benzoyl peroxide are heated according to the procedure described under Example I. The temperature is raised to 200–205° C. and the reaction mass maintained at this temperature until a sample diluted to 60% solids in low flash solvent naptha has a viscosity of U. When this viscosity is reached the low flash solvent naphtha is added to form the resin solution.

Physical constants of the final resin solution were:

| | |
|---|---|
| Viscosity | U |
| Color | 2 |
| Solids percent | 58.0 |

The resin solution further diluted to a flowing viscosity and to which was added 0.1% (based on the oil content) of cobalt drier solution air dried in approximately one hour.

Example III

| | Parts |
|---|---|
| Linseed oil-dimethallyl maleate intermediate (interpolymer) | 1500 |
| Styrene | 772 |
| Low flash solvent naphtha | 972 |

The styrene and the linseed oil intermediate product are heated in a round bottomed three necked flask equipped as previously described, with a stirrer, thermometer which extends into the liquid and a reflux condenser. The liquid in the flask under thorough agitation is heated to 260° C. This temperature is maintained until a sample removed from the reaction vessel and diluted to approximately 70% solids with low flash solvent naphtha has a viscosity of U-W. The time required to reach this viscosity on heating at 260° C. is approximately 3 hours. The reacted mass is allowed to cool to approximately 225° C. and the solvent naphtha then added with agitation.

The finished resin solution had a viscosity of W; color 3 and solids content of 71%.

The resin solution containing 0.10% (based on the oil content) of cobalt drier yields films which air dry tack free in approximately 8 hours.

Example IV

| | Parts |
|---|---|
| Linseed oil-dimethallyl maleate interpolymer | 200 |
| Styrene | 125 |
| Benzoyl peroxide | 0.5 |
| Low flash solvent naphtha | 215 |

The linseed oil-dimethallyl maleate intermediate, styrene and benzoyl peroxide are treated according to the procedure described, the temperature being approximately 200° C. The time of refluxing at this temperature is approximately ½ hour. To the resin thus formed is then added the solvent naphtha.

The resin solution was found to have a viscosity of N; color 1.5 and solids content of 56%.

The resin solution diluted to flowing viscosity and containing 0.10% cobalt drier yielded films which air dried tack free in approximately 5 hours. The resin solution containing 0.01% (based on the oil content) of manganese drier yields hard and tough films when baked for approximately 1½ hours at 225° F. (107° C.).

The ratio of oil to dimethallyl maleate was 65 parts of the former and 35 parts of the latter.

Example V

| | Parts |
|---|---|
| Linseed oil-diallyl maleate intermediate (interpolymer) | 300 |
| Styrene | 100 |
| Industrial xylol | 217 |

The linseed oil-diallyl maleate intermediate and the styrene are heated under reflux at 215° C. as described under Example III. After the reaction is completed the xylol is added with agitation. The final resin solution has a viscosity of M and a solids content of approximately 60%. (Theoretical 65%.)

The resin solution bakes to a clear, homogeneous, hard film in 1½ hours at 200° F. (93° C.). The ratio of oil to ester in the interpolymer was 2:1.

Example VI

| | Parts |
|---|---|
| Soya bean oil-dimethallyl maleate intermediate (interpolymer ratio 65:35) | 200 |
| Styrene | 125 |
| Benzoyl peroxide | 0.5 |
| Low flash solvent naphtha | 217 |

The soya bean oil-dimethallyl maleate product, the styrene and the benzoyl peroxide are treated according to the procedure described under Example III. The temperature is maintained at the refluxing point until it reaches 240° C. It is then held at this point for from 1 to 1¼ hours after which time the solvent naphtha is added.

The physical constants of the final resin solution were:

| | |
|---|---|
| Viscosity | R |
| Color | 2 |
| Solids content per cent | 58.4 |

The resin solution further diluted and containing 0.1% (based on the oil content) of cobalt drier yields films which air dry to a slightly tacky stage in 7 hours. The same or a similar solution when baked at 200-225° F. (93-107° C.) for one hour yields a hard, tough and durable film.

While the examples relate to the use of styrene as the vinyl compound reacted with the unsaturated alcohol maleate-fatty oil interpolymer other vinyl compounds may be used as the vinyl esters of the lower fatty acids (vinyl acetate), vinyl halides, acrylic acid esters, alpha alkyl substituted acrylic acid esters and other similar polymerizable materials.

Oils other than linseed which have been reacted with the unsaturated alcohol maleates such as soya bean oil, dehydrated castor oil, etc. as described in my co-pending application Serial No. 335,787, now Patent No. 2,280,862, as previously noted, may also be used.

The products of the present invention are particularly adapted for use as the vehicle in the preparation of decorative and protective coating compositions as paints, enamels, etc. The vehicles may be suitably pigmented with various types of pigments to produce, e. g., black, white, or colored enamels. Fillers may be added if desired as well as dyestuffs. Other resinous materials, oils, and plasticizers may be used in conjunction therewith to impart desired or necessary properties. Further the products may be used without any pigmentation as clear finishing compositions. Compositions may be formulated which will air dry or which may be baked at elevated temperatures to produce hard, tough, durable water resistant films.

It will be apparent from the foregoing that means have been provided for the preparation of a new type of film forming material, from which films may be produced either by air drying or by baking at elevated temperatures. Further means have been provided whereby styrene and other vinyl type resins are made compatible with resins which are otherwise incompatible therewith. In addition an air drying oil modified polystyrene resin has been produced.

It is apparent that many widely different embodiments of this invention may be made without departing from the spirit and scope thereof, and therefore, it is not intended to be limited except as indicated in the appended claims.

I claim:

1. The process of preparing resinous interpolymers which comprises interpolymerizing (A)

styrene and (B) the resinous reaction product obtained by reacting at reacting temperatures a diester of maleic acid and an alcohol selected from the group consisting of allyl and methallyl alcohol and a fatty oil having drying properties and a degree of conjugation not greater than that of dehydrated castor oil.

2. An enamel containing an interpolymer of styrene and the resinous reaction product of a fatty oil having drying properties and a degree of conjugation not greater than that of dehydrated castor oil with a diester of maleic acid and an alcohol selected from the group consisting of allyl and methallyl alcohol.

3. As a new article of manufacture the interpolymer of (A) a fatty oil having drying properties and a degree of conjugation not greater than that of dehydrated castor oil with a diester of maleic acid and an alcohol selected from the group consisting of allyl and methallyl alcohol; and (B) material selected from the class consisting of styrene and vinyl esters of the saturated lower fatty acids.

4. The process of claim 1 in which the ester is diallyl maleate.

5. The process of claim 1 in which the ester is dimethallyl maleate.

6. The process of claim 1 in which the oil is linseed oil.

7. The process of claim 1 in which the oil is soya bean oil.

8. The process of claim 1 in which the oil is dehydrated castor oil.

9. The process of preparing resinous materials suitable for preparing varnishes and the like which comprises interpolymerizing styrene and a linseed oil-dimethallyl maleate reaction product.

10. The process of preparing resinous materials suitable for preparing varnishes and the like which comprises interpolymerizing styrene and a linseed oil-diallyl maleate reaction product.

11. The product of claim 3 in which the oil is linseed oil.

12. The product of claim 3 in which the oil is dehydrated castor oil.

13. The product of claim 3 in which the ester is diallyl maleate.

14. The product of claim 3 in which the ester is dimethallyl maleate.

BEN EDMUND SORENSON.